United States Patent
Weinmann et al.

(10) Patent No.: US 11,581,799 B2
(45) Date of Patent: Feb. 14, 2023

(54) RIPPLE DETECTOR FOR MONITORING A SUPPLY TO GALVANICALLY ISOLATED GATE DRIVER

(71) Applicant: Infineon Technologies AG, Neubiberg (DE)

(72) Inventors: Matthias Weinmann, Munich (DE); Michael Krug, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/307,860

(22) Filed: May 4, 2021

(65) Prior Publication Data

US 2022/0360163 A1 Nov. 10, 2022

(51) Int. Cl.
*H02M 1/14* (2006.01)
*H02M 1/08* (2006.01)
*H02M 3/335* (2006.01)

(52) U.S. Cl.
CPC ............... *H02M 1/14* (2013.01); *H02M 1/08* (2013.01); *H02M 3/33507* (2013.01); *H02M 3/33523* (2013.01); *H02M 3/33576* (2013.01)

(58) Field of Classification Search
CPC .......... H02M 1/08; H02M 1/14; H02M 3/335; H02M 3/33507; H02M 3/33523; H02M 3/33569; H02M 3/33576
See application file for complete search history.

(56) References Cited

U.S. PATENT DOCUMENTS 9,577,542 B2 * 2/2017 Lin ................... H02M 3/33507
2019/0207520 A1 * 7/2019 Imade ............... H02M 3/33507

OTHER PUBLICATIONS

NXP "VR5500 High voltage PMIC with multiple SMPS and LDO," Preliminary Data Sheet, Rev. 3, May 22, 2019, 130 pp.

* cited by examiner

*Primary Examiner* — Gary L Laxton
(74) *Attorney, Agent, or Firm* — Shumaker & Sieffert, P.A.

(57) ABSTRACT

A driver circuit is configured to control a power transistor. The driver circuit comprises a signal generator configured to generate a control signal for the power transistor based on a supply signal and an input signal from a control unit. In addition, the driver circuit includes a ripple detector configured to receive the supply signal and determine whether the supply signal includes a ripple error. In some examples, the ripple detector may be configured to send a warning signal to the control unit in response to detecting the ripple error.

20 Claims, 6 Drawing Sheets

RIPPLE DETECTOR FOR MONITORING A SUPPLY TO GALVANICALLY ISOLATED GATE DRIVER

TECHNICAL FIELD

This disclosure relates to gate driver circuits used to control power switches, and more specifically, to gate driver circuits that are galvanically isolated, such as those used to control high voltage power switches using power supply from a flyback power converter.

BACKGROUND

Gate driver circuits are used to control power switches in order to control the delivery of power within a system. For example, modulation control signals (e.g., pulse width modulation "PWM" signals) can be applied to the gates of power switches to control the on/off switching of the power switches. The on/off switching of a power switch can effectively control the delivery of power through the power switch to a load.

Flyback power converters typically utilize a transformer that galvanically isolates a primary side from a secondary side of the power converter. A gate driver on the secondary side may be used to control a power switch that operates in a high voltage domain. To generate a supply for controlling the gate driver on the secondary side, buffering capacitors may be used to create a stable supply voltage.

SUMMARY

This disclosure describes a driver circuit configured to control a power transistor, as well as systems that use the driver circuit and methods performed by the driver circuit. In some examples, the driver circuit may comprise a galvanically isolated driver circuit that is configured to control a power transistor on a secondary side of a power converter, where the secondary side is galvanically isolated from a primary side. The circuits and techniques may enable the ability the identify and react to a driver supply signal that includes an unacceptable ripple signal, which can be problematic and/or indicative of one or more circuit failures associated with the driver supply.

In one example, a driver circuit is configured to control a power transistor, and the driver circuit comprises a signal generator configured to generate a control signal for the power transistor based on a supply signal and an input signal from a control unit. In addition, the driver circuit includes a ripple detector configured to receive the supply signal and determine whether the supply signal includes a ripple error. If so, for example, the ripple detector may be configured to send a warning signal to the control unit in response to detecting the ripple error.

In another example, this disclosure describes a system that comprises a control unit, a power transistor, and a driver circuit configured to control the power transistor. The driver circuit may comprise a signal generator configured to generate a control signal for the power transistor based on a supply signal and an input signal from the control unit, and a ripple detector configured to receive the supply signal and determine whether the supply signal includes a ripple error.

In another example, this disclosure describes a method that comprises controlling a power transistor on a galvanically-isolated secondary side of a flyback power converter based on a supply signal and an input signal from a control unit, and determining whether the supply signal includes a ripple error.

Details of these and other examples are set forth in the accompanying drawings and the description below. Other features, objects, and advantages will be apparent from the description and drawings, and from the claims.

DETAILED DESCRIPTION

This disclosure describes a driver circuit configured to control a power transistor, as well as systems that use the driver circuit and methods performed by the driver circuit. In some examples, the driver circuit may comprise a galvanically isolated driver circuit that is configured to control a power transistor on a secondary side of a power converter, where the secondary side is galvanically isolated from a primary side. The circuits and techniques of this disclosure may be useful in a number of circuits or systems. One such application of the driver circuit of this disclosure is for a circuit associated with a main inverter of an electrical vehicle.

To generate a supply for controlling the driver circuit on the secondary side, buffering capacitors may be used to create a stable supply voltage. This type of supply generated via buffering capacitors can include a ripple (i.e., a ripple signal), and in the event of a failed capacitor within the buffering capacitors, the ripple signal may intensify. The techniques of this disclosure can enable the ability to identify and react to a supply signal that includes an unacceptable (e.g. intensified) ripple signal, which may be referred to as a ripple error. In response to the unacceptable ripple signal, the circuit may be configured to generate an alert and possibly implement a safe mode of operation. For an inverter circuit of an electric vehicle, for example, in response to the unacceptable ripple signal, the circuit may be configured to generate an alert to a microcontroller, and in response to the alert, the microcontroller may be configured to implement a safe mode of vehicle operation for the electric vehicle. This safe mode of vehicle operation is sometimes referred to as a "limp home" mode where vehicle power is reduced in the vehicle and vehicle operational features may be limited to essential vehicle operational features.

Figure 1:
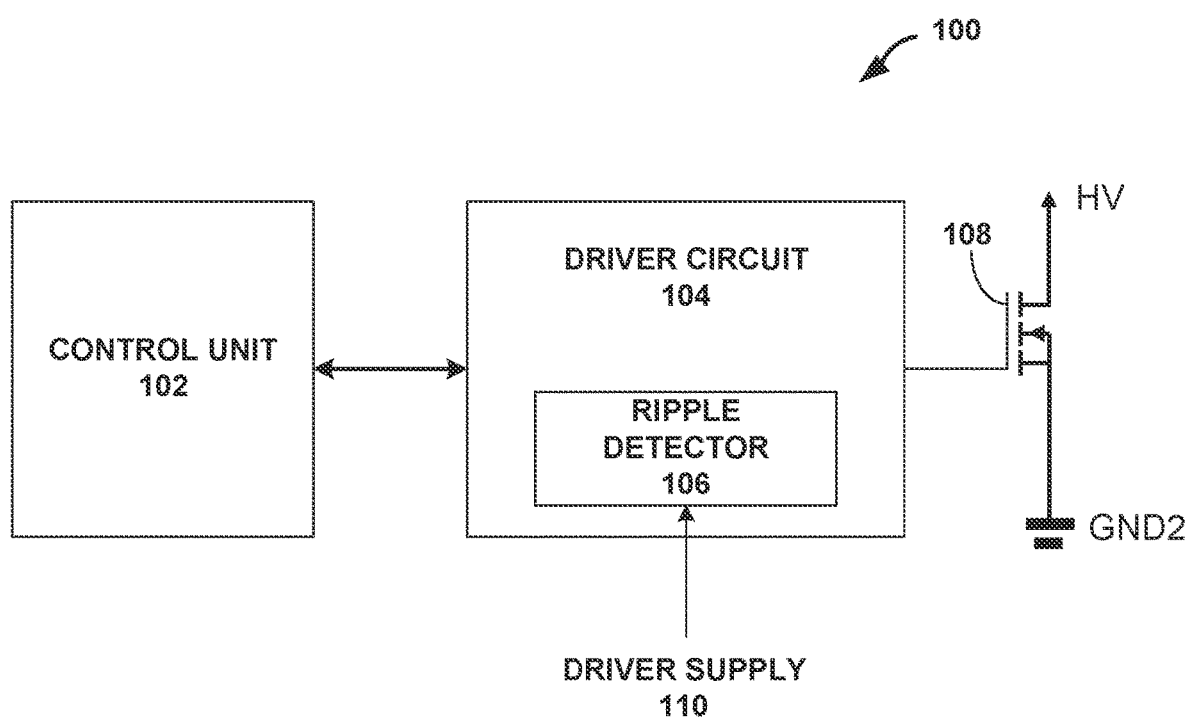
FIG. 1 is a block diagram showing an example system according to this disclosure.

FIG. 1 is a block diagram showing an example system 100 according to this disclosure. System 100 comprises a control unit 102, such as a microprocessor or an application specific integrated circuit (ASIC). In addition, system 100 comprises a power transistor 108, such as bipolar junction transistor (BJT) or a metal oxide semiconductor field effect transistor (MOSFET). The MOSFET, for example, may be formed in silicone, silicon carbide, gallium nitride, or another semiconductor material useful for transistor technology. Power transistor 108 may comprise a high voltage transistor capable of handling high amounts of direct current (DC)

voltages. If used within a main inverter of an electrical vehicle, for example, power transistor 108 may be rated to handle e.g., up to approximately 1200 volts. For other applications, the voltage ratings may be even higher.

In general, an inverter in an electric vehicle is a device that converts direct current (DC) power to alternating current (AC) power in order to drive an electric vehicle motor. As noted, one application of system 100 is for a circuit associated with a main inverter circuit of an electrical vehicle. However, system 100 could also be used in a number of other applications, such as industrial applications, wind turbine circuits, industrial motors, high speed rail circuits, or any application that uses a galvanically isolated gate driver circuit that receives a driver supply signal that may include ripples. Other example applications of system may include auxiliary drive applications, cooling fans, HVAC compressors, DC/DC converters, and onboard chargers, to name a few.

As shown in FIG. 1, system 100 includes a driver circuit 104 that is configured to control power transistor 108 based on a driver supply signal 110 and an input signal from control unit 102. Driver circuit 104 may be configured to generate a control signal for power transistor 108 that is based on driver supply signal 110 and an input signal from control unit 102. The control signal generated by driver circuit 104 for power transistor 108 may comprise a modulation signal used for controlling power transistors, such as so-called pulse width modulation (PWM) signal, a pulse frequency modulation (PFM) signal, a pulse duration modulation signal, a pulse density modulation signal, or another type of signal used for controlling power transistors.

In some circumstances, driver supply signal 110 may include a ripple (referred to herein as a ripple signal). In general, a ripple signal is a periodic signal with an alternating and periodic amplitude. Under normal circumstances, a ripple signal may comprise an acceptable level of noise on the supply signal. However, there are problems that can occur in driver supply signal 110 that can cause the ripple to intensify in magnitude. For example, if driver supply signal 110 is generated using a bank of buffering capacitors, driver supply signal 110 may include a ripple. Moreover, if one of the buffering capacitors associated with driver supply signal 110 malfunctions, this can cause an undesirable intensification of the ripple. To address such possible problems or malfunctions, driver circuit 104 includes a ripple detector 106, which is configured to receive driver supply signal 110 and determine whether driver supply signal 110 includes a ripple error. A ripple error, for example, may comprise a ripple signal that has an unacceptable magnitude.

Ripple detector 106 may be configured to send a warning signal to control unit 102 in response to detecting the ripple error. Moreover, control unit 102 may be configured to control the power transistor 108 according to a protection mode in response to the warning signal. For example, in response to receiving the warning signal from ripple detector, control unit 102 may be configured to control power transistor 108 according to a reduced power mode of operation. In the example of an inverter circuit of an electric vehicle, for example, the reduced power mode of operation may comprise the so-called "limp home" mode.

Figure 2A:
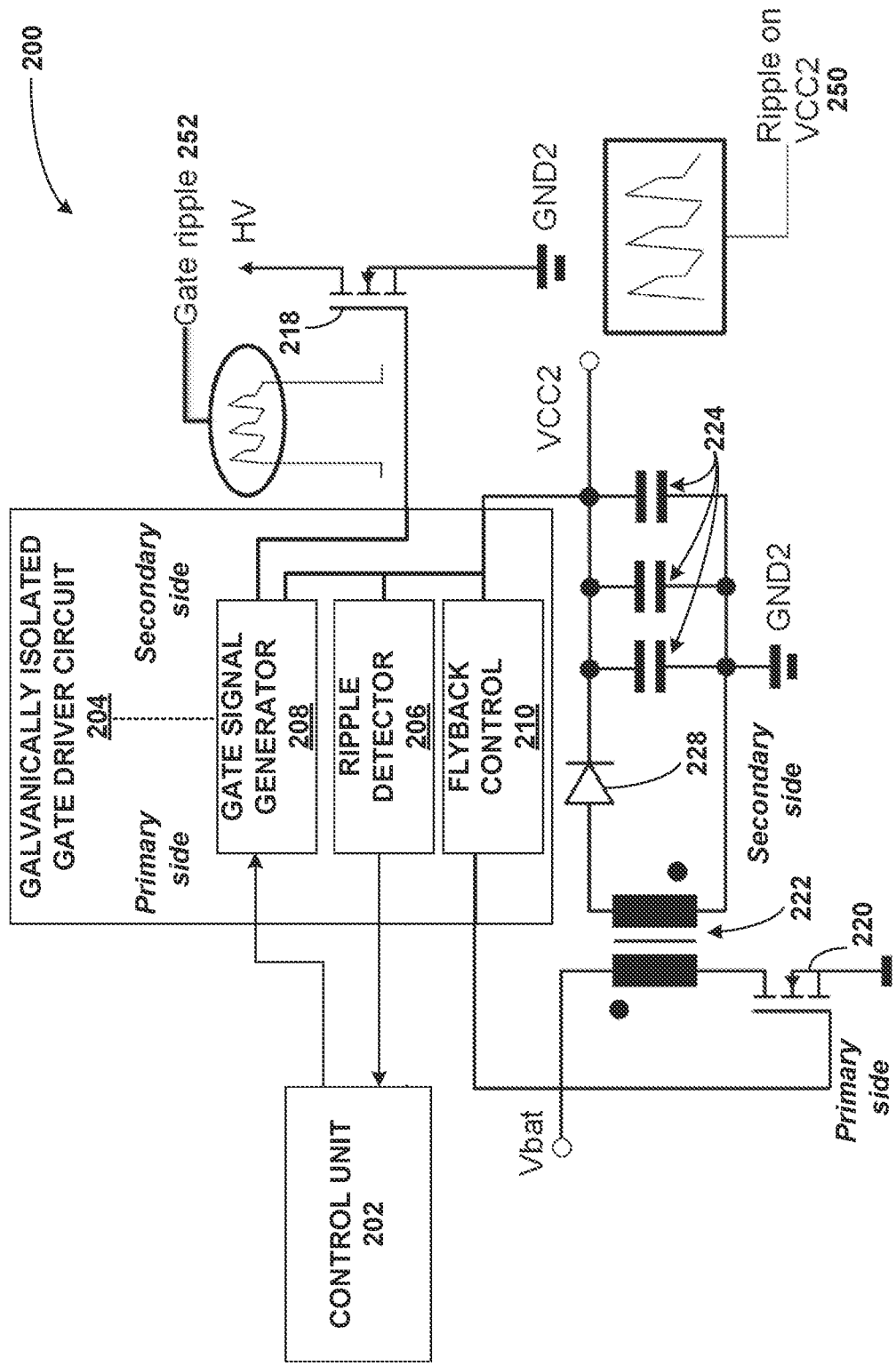
FIGS. 2A and 2B are diagrams illustrating a more detailed example of a system consistent with the teaching of this disclosure.
Figure 2B:
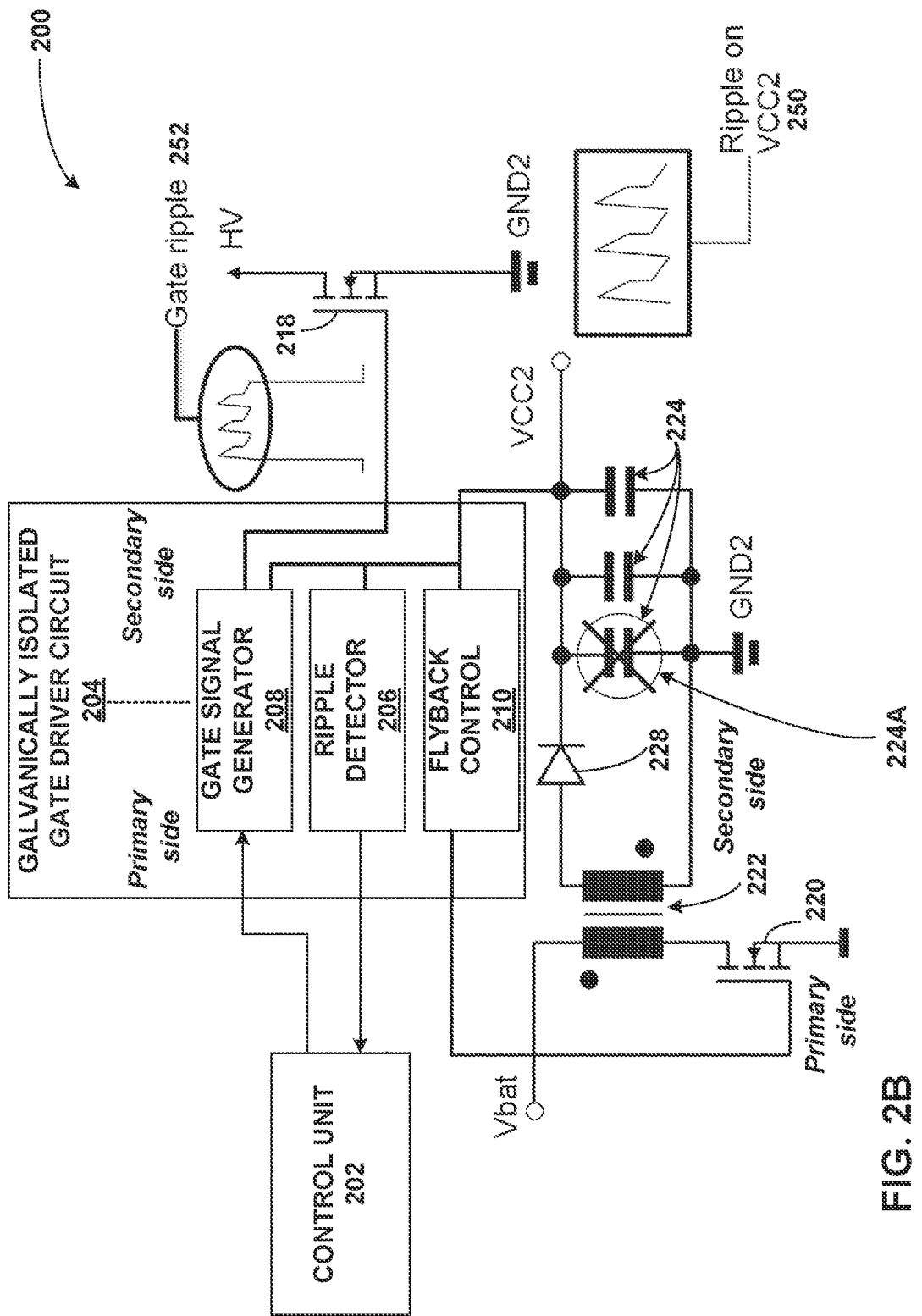

FIGS. 2A and 2B are diagrams illustrating a more detailed example of a system consistent with the teaching of this disclosure. System 200 shown in FIGS. 2A and 2B is one specific example of system 100 shown in FIG. 1, although other systems or circuits could benefit from the ripple detection techniques of this disclosure. For example, control unit 202 of FIGS. 2A and 2B may be one specific example of control unit 102 of FIG. 1, driver circuit 204 may be one specific example of drive circuit 104, and power transistor 218 may be one specific example of power transistor 108.

As shown in FIGS. 2A and 2B, driver circuit 204 comprises a galvanically isolated gate driver circuit that is configured to control power transistor 218 on a secondary side of system 200. System 200 may comprise a primary side that operates in a low voltage domain and a secondary side that operates in a high voltage domain. The primary side and secondary side are galvanically isolated from one another. The primary side and secondary side may operate control the supply signal labeled as VCC2 in FIGS. 2A and 2B.

Transformer 222 separates the primary side form the secondary side. A power transistor 220 operates on the primary side to control power from a battery (Vbat) into transformer 222. Transformer 222 comprises two coils (e.g., two inductors), and energy passes through transformer 222 over the galvanic isolation barrier via electromagnetic principles. In particular, current through the coil on the primary side of transformer 222 creates a magnetic field that induces current in the coil on the secondary side of transformer 222. Such current on the secondary coil of transformer 222 passes through diode 228 and charges buffering capacitors 224 in order to create a desirable voltage level for supply signal VCC2, which is a supply signal for driver circuit 204.

The components of driver circuit 204 are also separated with a galvanic barrier. That is to say, driver circuit 204 also includes a primary side and a secondary side that are galvanically isolated. The galvanic isolation of one or more components of driver circuit 204 (e.g., gate signal generator 208, ripple detector 206, and/or flyback control unit 210) may use one or more transformers, such as one or more so-called "coreless" transformers that use two stacked windings. Alternatively or additionally, galvanic isolation of one or more components of driver circuit 204 may use one or more capacitors to achieve capacitive galvanic isolation. In still other examples, galvanic isolation of one or more components of driver circuit 204 may use an inductive sender and a magnetic receiver. Optical signals and optocouplers could also be used for communication across a galvanic barrier. These or other components may be used to ensure that components of driver circuit 204 are also separated with a galvanic barrier.

Flyback control unit 210 operates on the primary side based on supply signal VCC2 that is on the secondary side. Flyback control unit 210 forms a control loop for the flyback power converter whereby flyback control unit 210 sends gate control signals to control power transistor 220 on the primary side so as to regulate the supply signal VCC2 on the secondary side.

Gate signal generator 208 operates on the secondary side and controls power transistor 218 based on a driver supply signal VCC2 and an input signal from control unit 202. Gate signal generator 208 generates a modulation signal, such as a PWM signal, a PFM signal, a pulse duration modulation signal, a pulse density modulation signal, or another type of signal used for controlling power transistors. The modulation signal is based on supply signal VCC2 and the input signal from control unit 202.

Supply signal VCC2 may include a ripple (conceptually illustrated in FIGS. 2A and 2B as ripple 250). This ripple may be the result of the buffering capacitors 224 and may have an acceptable signal amplitude under normal operating conditions. Due to the ripple on supply signal VCC2, a gate ripple (conceptually illustrated in FIGS. 2A and 2B as ripple 250) may also be present in the control signals generated by gate signal generator 208. Gate ripple 252 may comprise an acceptable level of noise during normal operation where all of capacitors 224 are operational.

However, if one of the buffering capacitors 224 associated with supply signal VCC2 malfunctions, this can cause an undesirable intensification of the ripple. Capacitor malfunction is conceptually illustrated in FIG. 2B, whereby one of buffering capacitors 224, namely buffering capacitor 224A, malfunctions. In this case, gate ripple 252 may define an unacceptable magnitude and may affect circuit operation or possibly circuit safety.

To address malfunctions in one or more of buffering capacitors 224, driver circuit 204 includes a ripple detector 206. Ripple detector 206 operates on the secondary side of system 200 and sends information across the galvanic isolation barrier to control unit 202 in the event problems are detected. Ripple detector 206 is configured to receive supply signal VCC2 and determine whether driver supply signal VCC2 includes a ripple error. A ripple error, for example, may comprise a ripple signal that has an unacceptable magnitude. As described in greater detail below, for example, ripple detector 206 may be configured to determine whether supply signal VCC2 exceeds a threshold, and to count a number of instances that supply signal VCC2 exceeds the threshold within a time period. If supply signal VCC2 exceeds the threshold for a number of instances within a period of time, this indicates ripple error. Accordingly, ripple detector 206 can identify ripple error by counting and tracking how often supply signal VCC2 exceeds the threshold. In some examples, the threshold may be a programmable threshold.

Ripple detector 206 may also be configured to send a warning signal across the galvanic isolation barrier to control unit 202 in response to detecting the ripple error. Moreover, control unit 202 may be configured to control the power transistor 208 according to a protection mode in response to the warning signal. For example, in response to receiving the warning signal from ripple detector, control unit 202 may be configured to control power transistor 108 according to a reduced power mode of operation.

Figure 3:
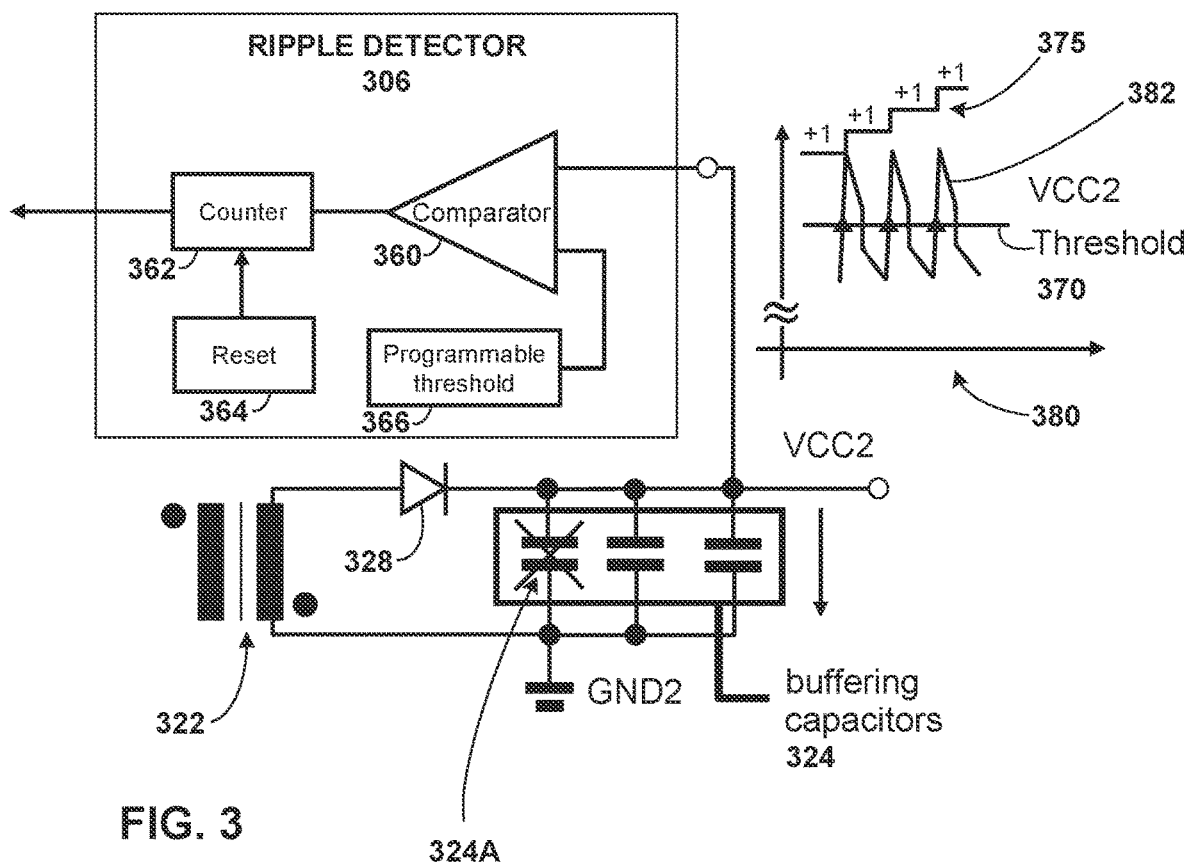
FIG. 3 is a diagram illustrating one example of a ripple detector that may be part of a driver circuit to monitor the driver supply signal.

FIG. 3 is a diagram illustrating one example of a ripple detector 306 that may be part of a driver circuit to monitor the driver supply signal according to this disclosure. In some examples, ripple detector 306 may correspond to ripple detector 206 of FIGS. 2A and 2B, although ripple detector 306 could also be used in other circuit configurations. Similarly, in some examples, transformer 322, diode 328, and buffering capacitors 324 of FIG. 3 may correspond to transformer 222, diode 228, and buffering capacitors 224 of FIGS. 2A and 2B.

As shown in FIG. 3, if one of the buffering capacitors 324 associated with supply signal VCC2 malfunctions, this can cause an undesirable intensification of the ripple. Capacitor malfunction is conceptually illustrated in FIG. 3, whereby one of buffering capacitors 324, namely buffering capacitor 324A, malfunctions.

To detect a malfunction of one or more of buffering capacitors 324 (e.g., buffering capacitor 324A), ripple detector 306 may comprise a comparator 360 and a counter 362. Comparator 360 is configured to compare supply signal VCC2 to a programmable threshold stored in programmable threshold unit 366, which may comprise a memory, e.g., a one-time programmable (OTP) memory or rewritable memory, that is programmable by a user to configure the circuit for a given application. The programmable threshold stored in programmable threshold unit 366 is also conceptually illustrated in graphical form as VCC2 threshold 370 in graph 380. Counter 362 may be configured to count a number of instances that the supply signal VCC2 from buffering capacitors 324 exceeds VCC2 threshold 370 within a time period. This counting is conceptually shown in graphical form as counts 375. A reset timer 364 may establish and periodically reset the time period for counter 362.

Ripple detector 306 may operate on a secondary side of power converter, and ripple detector 306 may be configured to send information across the galvanic isolation barrier to a control unit (e.g. control unit 202 in the example of FIGS. 2A and 2B) in the event problems are detected. In summary, ripple detector 306 is configured to receive supply signal VCC2 and determine whether driver supply signal VCC2 includes a ripple error. A ripple error, for example, may comprise a ripple signal that has an unacceptable magnitude a number of instances in a defined time period, as conceptually shown in the graphical form as counts 375 that VCC2 threshold 370 is exceeded within a defined time period. If supply signal VCC2 exceeds the VCC2 threshold 370 for a pre-defined number of instances within a period of time, this may indicate ripple error. Accordingly, ripple detector 306 can identify ripple error by counting (via counter 362) how often comparator 360 identifies the supply signal VCC2 as exceeding the programmable threshold stored in programmable threshold unit 366.

In some cases, ripple detector 306 may also be configured to output a warning signal across the galvanic isolation barrier to a control unit in response to detecting the ripple error. As shown in graph 380, a ripple error may comprise a periodic signal 382 that exceeds a VCC2 threshold 370 a plurality of instances as defined by counts 375 within a period of time. Ripple detector 306 may be configured to output an indication of the ripple error in response to counter 362 exceeding a defined number of counts 375 within a time period. Again, reset unit 364 may be configured to reset counter 362 after the time period. In this way, ripple detector 306 can allow a system to adequately monitor supply signal VCC2 and react to problems in the supply signal VCC2 that may be the result of a failed capacitor 324A.

A failed capacitor 324A may be caused by one or more circuit failures or problems. A failed capacitor 324A, for example, may be the result of broker wires, broken solder joints, aging and loss of capacitance due to aging, or possibly capacitor failure due to vibrational strain, temperature strain, or mechanical breakage of ceramics. These or other factors or causes may result in a failed capacitor 324A. A ripple detector 206, 306, according to this disclosure may allow the circuit to identify and react a capacitor failure that is the result of any of these or other causes.

In some examples, ripple detector 206, 306 may be controlled at least in part by flyback control unit 210. In this case, reset unit 364 and counter 362 may be controlled based on the switching frequency of the flyback converter, which may be controlled by flyback control unit 210. In other words, these units may be combined or connected, and flyback control unit 210 can synchronize operation of reset unit 364 and counter 362 to the switching frequency of primary side power transistor 220.

Furthermore, when the operation of ripple detector 206, 306 is controlled at least in part by flyback control unit 210, flyback control unit 210 may apply high frequency switching on primary side power transistor 220, and flyback control 210 can set a lower internal reset timing to be applied by reset unit 364 and counter 362. By defining the operation of reset unit 364 and counter 362 based on the switching frequency of primary side power transistor 220, system operation and detection time can be improved in operation at different switching frequencies, in the event of capacitor failure. Primary side power transistor 220, for example, may operate at one frequency (e.g., 100 kHz) for start-up tests and pre-charging of the buffering capacitors 224, 324, but may operate at a second, higher frequency (e.g., 250 kHz) for normal operating mode. Also, frequency wobbling with, e.g., +/−15%, frequency variation around a fixed frequency may be used to improve average electromagnetic compatibility (EMC) behavior of system 200. In these and other situations where the switching frequency may change, counting of ripples and reset of the counting can be synchronized and controlled based on the switching frequency of primary side power transistor 220 in order to improve the reaction time in response to a failed capacitor.

Figure 4:
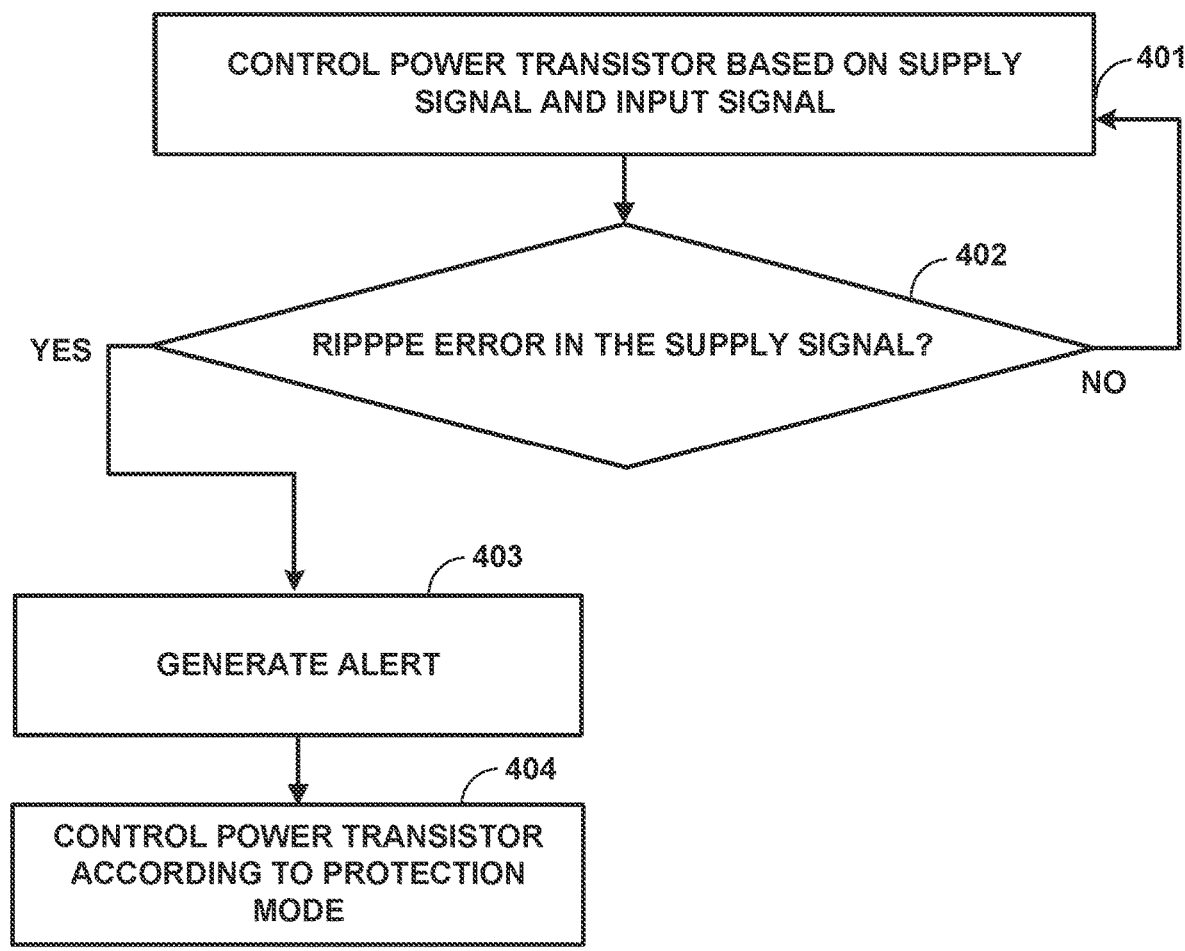
FIGS. 4 and 5 are a flow diagrams showing techniques according to this disclosure.

FIG. 4 is a flow diagram showing a technique according to this disclosure. FIG. 4 will be described from the perspective of system 100 shown in FIG. 1, although other circuits or systems could perform the technique. As shown in FIG. 4, driver circuit 104 controls power transistor 108 based on an input signal form control unit 102 and a supply signal from driver supply signal 110 (401). Power transistor 108 may reside on a galvanically-isolated secondary side of a flyback power converter.

Ripple detector 106 monitors driver supply signal 110 and determines if there is ripple error in driver supply signal 110 (402). For example, as described herein, ripple detector 106 may be configured to count a number of instances that driver supply signal 110 exceeds a threshold within a period of time. If driver supply signal 110 exceeds the threshold by a pre-defined number of instances within the period of time, this indicates ripple error.

In response to detecting ripple error in driver supply signal 110 (yes branch of 402), driver circuit 104 may be configured to generate an alert (403). For example, the alert may comprise a warning signal sent from driver circuit 104 to control unit 102. In response to the warning signal, control unit 102 may be configured to send control signals back to driver circuit 104, which cause driver circuit 104 to control power transistor 108 according to a protection mode (404). Again, as described herein, with the example of an inverter circuit of an electric vehicle, controlling power transistor 108 according to a protection mode (404) may comprise a so-called "limp home" mode for the vehicle where power is reduced to protect the vehicle while still allowing the vehicle to operate in a reduced power mode (possibly for a limited amount of time or distance) in order for a vehicle operator to deliver the vehicle to a maintenance center.

Figure 5:
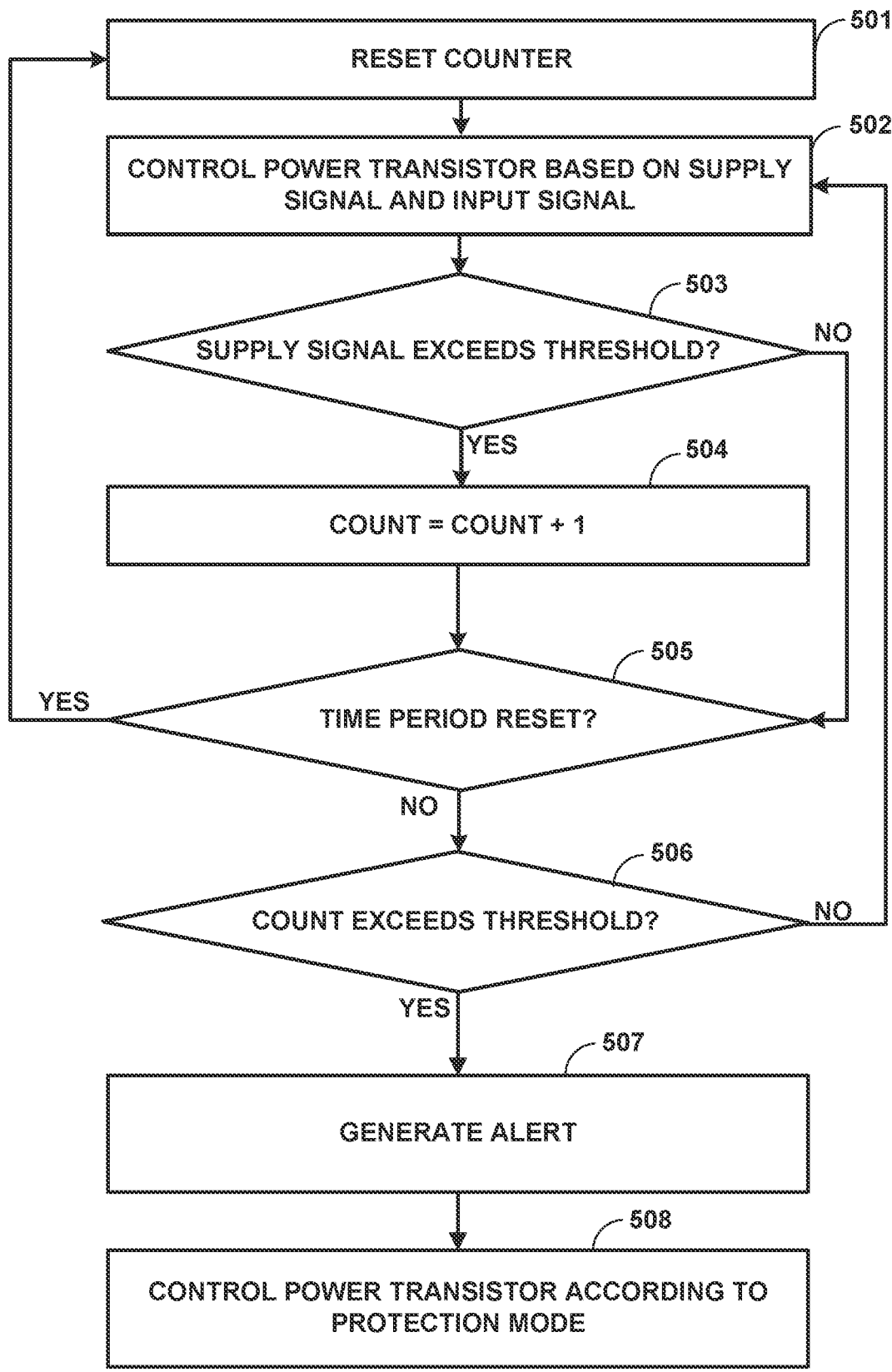

FIG. 5 is another flow diagram showing a technique according to this disclosure. FIG. 5 will be described from the perspective of system 200 shown in FIGS. 2A and 2B and from the perspective of ripple detector 306 of FIG. 3, although other circuits or systems could perform the technique. As shown in FIG. 5, counter 362 is reset by reset unit 364 (501), and driver circuit 204 controls power transistor 218 based on a supply signal VCC2 and an input signal from control unit 202 (502). Comparator 360 determines whether the supply signal VCC2 exceeds a threshold (503), which may be stored in programmable threshold unit 366. If comparator 360 determines that the supply signal VCC2 exceeds the threshold (yes branch of 503), counter 362 increments its count. In other words, if comparator 360 determines that the supply signal VCC2 exceeds the threshold (yes branch of 503), counter 362 sets its count as count=count+1. This counting may continue for the duration of a time period defined by reset unit 364. For this period of time defined by reset unit 364 (no branch of 505), comparator 360 determines whether the supply signal VCC2 exceeds the threshold (yes branch of 503), and if so counter 362 increments its count (504). This incremented counting is also conceptually illustrated in graph 380 of FIG. 3.

If the count exceeds a threshold number of counts (506), ripple detector 206, 306 causes driver circuit 204 to generate an alert (507). Driver circuit 204 communicates the alert across a galvanic isolation barrier to control unit 202, which in turn causes control unit 202 to implement a protection mode for power transistor 218. Accordingly, in response to the warning signal, the control signals from control unit 202 may be adjusted to cause driver circuit 204 to control power transistor 218 according to a protection mode (508). Periodically, counter 362 may be reset by reset unit 364 (501), e.g., after a period of time (yes branch of 505).

As exampled above, for the example of a main inverter circuit of an electric vehicle, driver circuit 204 controlling power transistor 218 according to a protection mode (508) may comprise controlling power transistor 218 according to a vehicle protection mode in response to detecting the ripple error. In this way, circuit safety is promoted, vehicle safety is promoted, and stable supply signal monitoring is achieved.

In some situations, the described circuit may also reduce system cost by allowing fewer (or cheaper) capacitors to be used within a bank of buffering capacitors. For example, some circuit applications of the circuits described herein may implement fewer (or cheaper, lower-rated) capacitors within a bank of buffering capacitors than might otherwise be needed in the absence of ripple monitoring of the supply signal.

The following clauses may illustrate one or more aspects of the disclosure.

Clause 1—A driver circuit configured to control a power transistor, the driver circuit comprising: a signal generator configured to generate a control signal for the power transistor based on a supply signal and an input signal from a control unit; and a ripple detector configured to receive the supply signal and determine whether the supply signal includes a ripple error.

Clause 2—The driver circuit of clause 1, wherein the ripple detector is configured to send a warning signal to the control unit in response to detecting the ripple error.

Clause 3—The driver circuit of clause 1 or 2 wherein the driver circuit is configured to control a flyback power converter, wherein the power transistor comprises a secondary side power transistor, wherein the driver circuit further comprises a flyback control loop for controlling a primary side power transistor.

Clause 4—The driver circuit of clause 3, wherein the ripple detector is controlled based at least in part on a switching frequency of the primary side power transistor.

Clause 5—The driver circuit of any of clauses 1-4, wherein the ripple error is indicative of a failed capacitor associated with the supply signal.

Clause 6—The driver circuit of any of clauses 1-5, wherein the ripple error comprises a periodic signal that exceeds a threshold a plurality of instances within a period of time.

Clause 7—The driver circuit of any of clauses 1-6, wherein the ripple detector comprises a comparator configured to compare the supply signal to a threshold.

Clause 8—The driver circuit of any of clause 7, wherein the ripple detector comprises a counter configured to count a number of instances that the supply signal exceeds the threshold.

Clause 9—The driver circuit of clause 8, wherein the ripple detector is configured to output an indication of the ripple error in response to the counter exceeding a defined number of counts within a time period.

Clause 10—The driver circuit of clause 8 or 9, wherein the ripple detector includes a reset unit configured to reset the counter after the time period.

Clause 11—The driver circuit of any of clauses 7-10, wherein the threshold is a programmable threshold.

Clause 12—The driver circuit of any of clauses 1-11, wherein the supply signal is based on a charge on a plurality of buffering capacitors.

Clause 13—The driver circuit of clause 12, wherein the ripple error is indicative of a failed capacitor within the plurality of buffering capacitors.

Clause 14—A system comprising: a control unit; a power transistor; and a driver circuit configured to control the power transistor, the driver circuit comprising: a signal generator configured to generate a control signal for the power transistor based on a supply signal and an input signal from the control unit; and a ripple detector configured to receive the supply signal and determine whether the supply signal includes a ripple error.

Clause 15—The system circuit of clause 14, wherein the ripple detector is configured to send a warning signal to the control unit in response to detecting the ripple error.

Clause 16—The system of clause 15, wherein the control unit is configured to control the power transistor according to a protection mode in response to the warning signal.

Clause 17—The system of any of clauses 14-16, wherein the ripple detector comprises: a comparator configured to compare the supply signal to a threshold; and a counter configured to count a number of instances that the supply signal exceeds the threshold, wherein the ripple detector is configured to output an indication of the ripple error in response to the counter exceeding defined number of counts within a time period.

Clause 18—The system of claim any of clauses 14-17, further comprising a plurality of buffering capacitors, wherein the supply signal is defined based on a charge on the plurality of buffering capacitors, and wherein the ripple error is indicative of a failed capacitor within the plurality of buffering capacitors.

Clause 19—A method comprising: controlling a power transistor on a galvanically-isolated secondary side of a flyback power converter based on a supply signal and an input signal from a control unit; and determining whether the supply signal includes a ripple error.

Clause 20—The method of clause 19, wherein determining whether the supply signal includes a ripple error comprises: counting a number of instances that the supply signal exceeds a threshold within a period of time.

Clause 21—The method of clause 19-20, wherein the method comprises controlling a main inverter circuit of an electric vehicle, the method further comprising: controlling the power transistor according to a vehicle protection mode in response to detecting the ripple error.

Various aspects have been described in this disclosure. These and other aspects are within the scope of the following claims.

The invention claimed is:

1. A driver circuit configured to control a power transistor, the driver circuit comprising:
a signal generator configured to generate a control signal for the power transistor based on a supply signal and an input signal from a control unit; and
a ripple detector configured to receive the supply signal and determine whether the supply signal includes a ripple error, wherein the ripple error comprises a periodic signal that exceeds a threshold a plurality of instances within a period of time.

2. The driver circuit of claim 1, wherein the ripple detector is configured to send a warning signal to the control unit in response to detecting the ripple error.

3. The driver circuit of claim 1, wherein the driver circuit is configured to control a flyback power converter, wherein the power transistor comprises a secondary side power transistor, wherein the driver circuit further comprises a flyback control loop for controlling a primary side power transistor.

4. The driver circuit of claim 1, wherein the power transistor comprises a secondary side power transistor and the ripple detector is controlled based at least in part on a switching frequency of a primary side power transistor.

5. The driver circuit of claim 1, wherein the ripple error is indicative of a failed capacitor associated with the supply signal.

6. The driver circuit of claim 1, wherein the ripple detector comprises a comparator configured to compare the supply signal to the threshold.

7. The driver circuit of claim 6, wherein the ripple detector comprises a counter configured to count a number of instances that the supply signal exceeds the threshold.

8. The driver circuit of claim 7, wherein the ripple detector is configured to output an indication of the ripple error in response to the counter exceeding a defined number of counts within the period of time.

9. The driver circuit of claim 8, wherein the ripple detector includes a reset unit configured to reset the counter after the period of time.

10. The driver circuit of claim 6, wherein the threshold is a programmable threshold.

11. The driver circuit of claim 1, wherein the supply signal is based on a charge on a plurality of buffering capacitors.

12. The driver circuit of claim 11, wherein the ripple error is indicative of a failed capacitor within the plurality of buffering capacitors.

13. A system comprising:
a control unit;
a power transistor; and
a driver circuit configured to control the power transistor, the driver circuit comprising:
a signal generator configured to generate a control signal for the power transistor based on a supply signal and an input signal from the control unit; and
a ripple detector configured to receive the supply signal and determine whether the supply signal includes a ripple error, wherein the ripple error comprises a periodic signal that exceeds a threshold a plurality of instances within a period of time.

14. The system circuit of claim 13, wherein the ripple detector is configured to send a warning signal to the control unit in response to detecting the ripple error.

15. The system of claim 14, wherein the control unit is configured to control the power transistor according to a protection mode in response to the warning signal.

16. The system of claim 13, wherein the ripple detector comprises:
a comparator configured to compare the supply signal to the threshold; and
a counter configured to count a number of instances that the supply signal exceeds the threshold, wherein the ripple detector is configured to output an indication of the ripple error in response to the counter exceeding defined number of counts within the period of time.

17. The system of claim 13, further comprising a plurality of buffering capacitors, wherein the supply signal is defined based on a charge on the plurality of buffering capacitors, and wherein the ripple error is indicative of a failed capacitor within the plurality of buffering capacitors.

18. A method comprising:
controlling a power transistor on a galvanically-isolated secondary side of a flyback power converter based on a supply signal and an input signal from a control unit; and
determining whether the supply signal includes a ripple error, wherein determining whether the supply signal includes a ripple error comprises counting a number of instances that the supply signal exceeds a threshold within a period of time.

19. The method of claim 18, further comprising:
controlling the power transistor according to a protection mode in response to detecting the ripple error.

20. A driver circuit configured to control a power transistor, the driver circuit comprising:
a signal generator configured to generate a control signal for the power transistor based on a supply signal and an input signal from a control unit; and
a ripple detector configured to receive the supply signal and determine whether the supply signal includes a ripple error, wherein the ripple error is indicative of a failed capacitor associated with the supply signal.

* * * * *